(12) United States Patent
She et al.

(10) Patent No.: US 12,409,709 B2
(45) Date of Patent: Sep. 9, 2025

(54) MEDIUM-TO-HIGH VOLTAGE POWER SYSTEM FOR A TRANSPORT REFRIGERATION UNIT

(71) Applicant: Carrier Corporation, Palm Beach Gardens, FL (US)

(72) Inventors: Xu She, Cohoes, NY (US); Hanjong Kim, Avon, CT (US); Jeffrey Burchill, Baldwinsville, NY (US); Mary Saroka, Syracuse, NY (US); Christopher Repice, Camillus, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 252 days.

(21) Appl. No.: 18/148,513

(22) Filed: Dec. 30, 2022

(65) Prior Publication Data
US 2023/0211648 A1 Jul. 6, 2023

Related U.S. Application Data

(60) Provisional application No. 63/296,335, filed on Jan. 4, 2022.

(51) Int. Cl.
*B60H 1/32* (2006.01)
(52) U.S. Cl.
CPC ......... *B60H 1/3228* (2019.05); *B60H 1/3202* (2013.01)

(58) Field of Classification Search
CPC ................ B60H 1/3228; B60H 1/3202; B60H 1/00428; B60H 1/3232; H02J 1/102; H02J 1/082; H02J 1/00; H02J 1/0063; H02J 2207/20; H02M 3/00; H02M 7/02; F25B 1/00
See application file for complete search history.

(56) References Cited

U.S. PATENT DOCUMENTS

| | | | |
|---|---|---|---|
| 7,719,126 B2 | 5/2010 | Foreman | |
| 8,295,950 B1 | 10/2012 | Wordsworth et al. | |
| 10,300,831 B2 | 5/2019 | Dziuba et al. | |
| 10,899,192 B2 | 1/2021 | Larson et al. | |

(Continued)

FOREIGN PATENT DOCUMENTS

| | | |
|---|---|---|
| CN | 205344439 U | 6/2016 |
| CN | 108202575 A | 6/2018 |

(Continued)

OTHER PUBLICATIONS

European Search Report for Application No. 22216233.1, Issued Jun. 1, 2023, 5 Pages.

(Continued)

*Primary Examiner* — Marc E Norman
(74) *Attorney, Agent, or Firm* — CANTOR COLBURN LLP

(57) ABSTRACT

A high-voltage system for a transport refrigeration unit (TRU) includes a high-voltage direct current (HVDC) source, and a first converter coupling the HVDC source to a distribution bus, the distribution bus is coupled to a compressor, at least one condenser, and at least one evaporator. A distribution bus is coupled to a compressor bus coupled to the compressor, a condenser bus coupled to the at least one condenser, and an evaporator bus coupled to the at least one evaporator.

7 Claims, 19 Drawing Sheets

(56) References Cited

U.S. PATENT DOCUMENTS

| | | | |
|---|---|---|---|
| 2010/0171364 A1* | 7/2010 | Awwad | B60H 1/3226 700/282 |
| 2011/0018349 A1 | 1/2011 | Rockenfeller et al. | |
| 2013/0000342 A1* | 1/2013 | Blasko | B60H 1/00428 62/235.1 |
| 2015/0183291 A1* | 7/2015 | Higuchi | B60H 1/00392 62/133 |
| 2017/0302200 A1 | 10/2017 | Marcinkiewicz | |
| 2018/0162370 A1 | 6/2018 | Colavincenzo et al. | |
| 2019/0255906 A1 | 8/2019 | Poolman et al. | |
| 2020/0055366 A1 | 2/2020 | Rydkin et al. | |
| 2020/0189361 A1 | 6/2020 | Radcliff | |
| 2020/0198519 A1 | 6/2020 | Liao et al. | |
| 2020/0247218 A1 | 8/2020 | Zheng et al. | |
| 2020/0290459 A1 | 9/2020 | Saroka et al. | |
| 2021/0083335 A1 | 3/2021 | Sadeghi et al. | |
| 2021/0129702 A1 | 5/2021 | She et al. | |
| 2021/0197645 A1 | 7/2021 | Larson et al. | |
| 2021/0213806 A1 | 7/2021 | Saroka et al. | |
| 2021/0252947 A1 | 8/2021 | She et al. | |
| 2021/0260964 A1 | 8/2021 | Saroka et al. | |
| 2021/0331559 A1 | 10/2021 | Ducher | |
| 2021/0331560 A1 | 10/2021 | She et al. | |
| 2023/0146546 A1* | 5/2023 | Marcinkiewicz | F25B 31/02 62/115 |
| 2023/0211646 A1 | 7/2023 | She et al. | |
| 2023/0278461 A1* | 9/2023 | Tompkins | B60L 58/13 701/22 |

FOREIGN PATENT DOCUMENTS

| | | |
|---|---|---|
| CN | 105751851 B | 11/2018 |
| CN | 209381738 U | 9/2019 |
| CN | 108923522 B | 11/2020 |
| CN | 214564491 U | 11/2021 |
| EP | 3626489 A1 | 3/2020 |

OTHER PUBLICATIONS

European Search Report for Application No. 23150312.9, Issued Jul. 5, 2023, 6 Pages.

* cited by examiner

MEDIUM-TO-HIGH VOLTAGE POWER SYSTEM FOR A TRANSPORT REFRIGERATION UNIT

CROSS-REFERENCE TO RELATED APPLICATIONS

This application claims the benefit of U.S. Provisional Application No. 63/296,335 filed Jan. 4, 2022, all of which are incorporated herein by reference in their entirety.

BACKGROUND

The present disclosure relates to transport refrigeration units, and more specifically, to medium-to-high voltage power systems for a transport refrigeration unit (TRU).

Transport refrigeration units are used to cool cargo in a trailer or cargo container. Existing transport refrigeration units employ an engine and a generator to produce electrical power (e.g., AC power) to drive the compressor and fans (e.g., evaporator fans, condenser fans). Existing sources of AC power produce unregulated AC power that can vary in voltage and frequency. There may be a need for an all-electric solution for providing AC and DC power to the various loads for transport refrigeration units.

BRIEF DESCRIPTION

According to an embodiment, a high-voltage system of a transport refrigeration unit (TRU) is provided. The high-voltage system can include a high-voltage direct current (HVDC) source; and a first converter coupling the HVDC source to a distribution bus, wherein the distribution bus is coupled to a compressor, at least one condenser, and an at least one evaporator.

In addition to one or more of the features described herein, or as an alternative, further embodiments include a distribution bus that is coupled to a compressor bus coupled to the compressor, a condenser bus coupled to the at least one condenser, and an evaporator bus coupled to the at least one evaporator.

In addition to one or more of the features described herein, or as an alternative, further embodiments include a first converter that is a DC-DC buck converter configured to step down voltage from the HVDC source, wherein the distribution bus is a low voltage DC bus.

In addition to one or more of the features described herein, or as an alternative, further embodiments include a compressor bus that comprises a DC motor that is mechanically coupled to an open drive compressor, wherein the evaporator bus and the condenser bus are coupled to at least one DC-DC buck converter that is used to convert voltage from the distribution bus for the at least one evaporator and the at least one condenser.

In addition to one or more of the features described herein, or as an alternative, further embodiments include a compressor bus that comprises a DC motor that is mechanically coupled to an open drive compressor, an evaporator bus that comprises at least one first DC-DC buck converter to convert voltage from the distribution bus for the at least one evaporator, a condenser bus that comprises at least one second DC-DC buck converter to convert voltage from the distribution bus for the at least one condenser, wherein the at least one first DC-DC buck converter and the at least one second DC-DC converter are different DC-DC converters.

In addition to one or more of the features described herein, or as an alternative, further embodiments include a compressor bus that comprises a DC motor that is mechanically coupled to an open drive compressor, an evaporator bus that comprises a DC-DC boost converter coupled to a DC-AC converter to convert voltage from the distribution bus for the at least one evaporator, a condenser bus that comprises a DC-DC boost converter coupled to a DC-AC converter to convert voltage from the distribution bus for the at least one condenser.

In addition to one or more of the features described herein, or as an alternative, further embodiments include a compressor bus that comprises a DC-DC boost converter coupled to a DC-AC converter for the compressor, an evaporator bus and the condenser bus that are coupled to at least one DC-DC buck converter that is used to convert voltage from the distribution bus for the at least one evaporator and the at least one condenser.

In addition to one or more of the features described herein, or as an alternative, further embodiments include a compressor bus that comprises a DC-DC boost converter coupled to a DC-AC converter for the compressor, an evaporator bus that comprises at least one first DC-DC buck converter to convert voltage from the distribution bus for the at least one evaporator, a condenser bus that comprises at least one second DC-DC buck converter to convert voltage from the distribution bus for the at least one condenser, wherein the at least one first DC-DC buck converter and the at least one second DC-DC converter are different DC-DC converters.

In addition to one or more of the features described herein, or as an alternative, further embodiments include a compressor bus that comprises a DC-DC boost converter coupled to a DC-AC converter, an evaporator bus that comprises a DC-DC boost converter coupled to a DC-AC converter, and a condenser bus that comprises a DC-DC boost converter coupled to a DC-AC converter.

In addition to one or more of the features described herein, or as an alternative, further embodiments include a first converter that is a DC-DC boost converter, wherein the distribution bus is a high-voltage DC distribution bus.

In addition to one or more of the features described herein, or as an alternative, further embodiments include a compressor bus that comprises a DC-DC buck converter coupled to a DC motor that is further mechanically coupled to an open drive compressor, an evaporator bus and the condenser bus that are coupled to at least one DC-DC buck converter that is used to convert voltage from the distribution bus for the at least one evaporator and the at least one condenser.

In addition to one or more of the features described herein, or as an alternative, further embodiments include a compressor bus that comprises a DC-DC buck converter coupled to a DC motor that is further mechanically coupled to an open drive compressor, an evaporator bus that comprises at least one first DC-DC buck converter to convert voltage from the distribution bus for the at least one evaporator, a condenser bus comprises at least one second DC-DC buck converter to convert voltage from the distribution bus for the at least one condenser, wherein the at least one first DC-DC buck converter and the at least one second DC-DC converter are different DC-DC converters.

In addition to one or more of the features described herein, or as an alternative, further embodiments include a compressor bus that comprises a DC motor and a DC-DC buck converter to convert voltage from the distribution bus, a DC motor that is mechanically coupled to an open drive compressor, an evaporator bus that comprises a DC-AC converter to convert voltage from the distribution bus for the at least one evaporator, a condenser bus that comprises a DC-AC converter to convert voltage from the distribution bus for the at least one condenser.

In addition to one or more of the features described herein, or as an alternative, further embodiments include a compressor bus that comprises a DC-AC converter to convert voltage from the distribution bus for the compressor, an evaporator bus and the condenser bus that are coupled to at least one DC-DC buck converter that is used to convert voltage from the distribution bus for the at least one evaporator and the at least one condenser.

In addition to one or more of the features described herein, or as an alternative, further embodiments include a compressor bus that comprises a DC-AC converter to convert voltage from the distribution bus for the compressor, an evaporator bus that comprises at least one first DC-DC buck converter to convert voltage from the distribution bus for the at least one evaporator, the condenser bus that comprises at least one second DC-DC buck converter to convert voltage from the distribution bus for the at least one condenser, wherein the at least one first DC-DC buck converter and the at least one second DC-DC converter are different DC-DC converters.

In addition to one or more of the features described herein, or as an alternative, further embodiments include a compressor bus that comprises a DC-AC converter to convert voltage from the distribution bus for the compressor, an evaporator bus that comprises a DC-AC converter to convert voltage from the distribution bus for the at least one evaporator, a condenser bus that comprises a DC-AC converter to convert voltage from the distribution bus for the at least one condenser.

In addition to one or more of the features described herein, or as an alternative, further embodiments include a first converter that is a DC-AC converter, wherein the distribution bus is an alternating current (AC) distribution bus.

In addition to one or more of the features described herein, or as an alternative, further embodiments include a compressor bus that comprises a motor and an AC-DC converter coupled to a DC-DC buck converter, an evaporator bus and the condenser bus that are coupled to an AC-DC converter coupled to at least one DC-DC buck converter that is used to convert voltage from the distribution bus for the at least one evaporator and the at least one condenser.

In addition to one or more of the features described herein, or as an alternative, further embodiments include a compressor bus that comprises a motor and an AC-DC converter coupled to a DC-DC buck converter, an evaporator bus that comprises at least one first AC-DC converter coupled to a first DC-DC buck converter to convert voltage from the distribution bus for the at least one evaporator, a condenser bus that comprises at least one second AC-DC converter coupled to a second DC-DC buck converter to convert voltage from the distribution bus for the at least one condenser, wherein the at least one first AC-DC converter and the at least one second AC-DC converter are different AC-DC converters wherein the at least one first DC-DC buck converter and the at least one second DC-DC buck converter are different DC-DC buck converters.

In addition to one or more of the features described herein, or as an alternative, further embodiments include a compressor bus that comprises an AC-DC converter coupled to a DC-AC converter, an evaporator bus that comprises an AC-DC converter coupled to a DC-AC converter, a condenser bus that comprises an AC-DC converter coupled to a DC-AC converter.

In addition to one or more of the features described herein, or as an alternative, further embodiments include a compressor bus that comprises an AC-DC converter coupled to a DC-AC converter, an evaporator bus and the condenser bus that are coupled to an AC-DC converter coupled to at least one DC-DC buck converter that is used to convert voltage from the distribution bus for the at least one evaporator and the at least one condenser.

In addition to one or more of the features described herein, or as an alternative, further embodiments include a compressor bus that comprises an AC-DC converter coupled to a DC-AC converter, an evaporator bus that comprises at least one first AC-DC converter coupled to a first DC-DC buck converter to convert voltage from the distribution bus for the at least one evaporator, a condenser bus that comprises at least one second AC-DC converter coupled to a second DC-DC buck converter to convert voltage from the distribution bus for the at least one condenser, wherein the at least one first AC-DC converter and the at least one second AC-DC converter are different AC-DC converters wherein the at least one first DC-DC buck converter and the at least one second DC-DC buck converter are different DC-DC buck converters.

In addition to one or more of the features described herein, or as an alternative, further embodiments include a compressor bus that comprises an AC-DC converter coupled to a DC-AC converter, an evaporator bus that comprises an AC-DC converter coupled to a DC-AC converter, a condenser bus that comprises an AC-DC converter coupled to a DC-AC converter.

In addition to one or more of the features described herein, or as an alternative, further embodiments include a high-voltage DC source that is between 100-750 volts.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
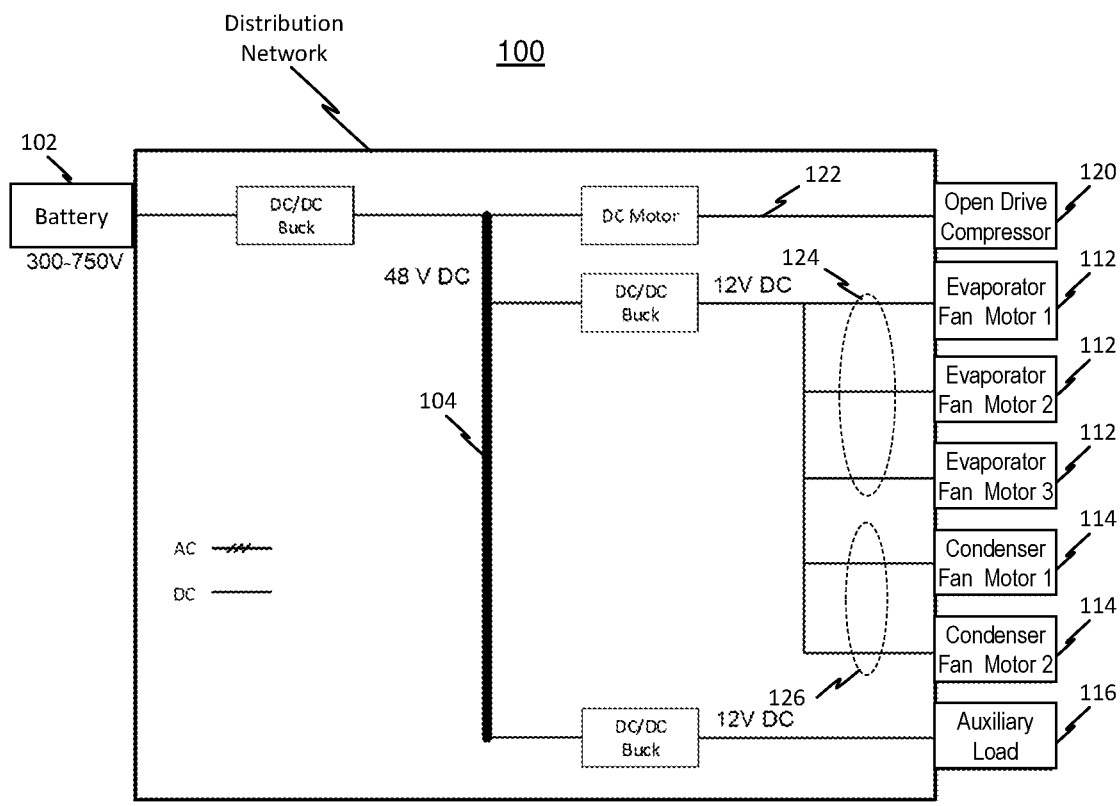
FIG. 1 depicts an exemplary electrical architecture for a transport refrigeration unit (TRU) configured to receive high-voltage power, in accordance with one or more embodiments of the disclosure.

FIG. 1 depicts an electrical architecture for a system 100 using a high-voltage power source in accordance with one or more embodiments of the disclosure. As shown in FIG. 1, the system 100 utilizes a direct current (DC) source as a source of power. In one or more embodiments of the disclosure, high-voltage can define a range of voltage between 100-750V. In a non-limiting example, the DC source is a high-voltage battery source, i.e., 350 VDC battery.

The distribution network of FIG. 1 can include a DC/DC buck converter that is coupled to the DC source 102. The DC/DC buck converter can step-down the voltage of the DC source 102 for a distribution bus 104. As shown in FIG. 1, the distribution bus 104 is a low-voltage DC distribution bus, i.e., 48 VDC bus, that can be coupled to one or more loads such as a motor and/or a DC/DC buck converter. The motor may be mechanically coupled to a compressor 120, i.e., open drive compressor. The mechanical coupling of the motor to the compressor 120 may comprise any known mechanical coupling.

The DC/DC buck converter is configured to reduce or step-down the voltage provided by the distribution bus 104. The distribution bus 104 may be coupled to and operable to provide power to a compressor bus 122, an evaporator bus 124, and a condenser bus 126. In different embodiments, the distribution bus may be further coupled to an auxiliary unit bus 130. The voltage from the distribution bus 104 is reduced when coupled to the compressor bus 122, the evaporator bus 124, and the condenser bus 126 using DC/DC buck converters. In one embodiment of the disclosure, the evaporator bus 124 and the condenser bus 126 are coupled to a single DC/DC buck converter. Each of the compressor bus 122, evaporator bus 124, and a condenser bus 126 may be a low voltage bus, i.e., 12 VDC bus, that is operable to provide power to one or more loads such as evaporator fans 112 and condenser fans 114. In one or more embodiments of the disclosure, the auxiliary unit bus 130 is operable to provide power to an auxiliary unit 116 such as a battery.

Figure 2:
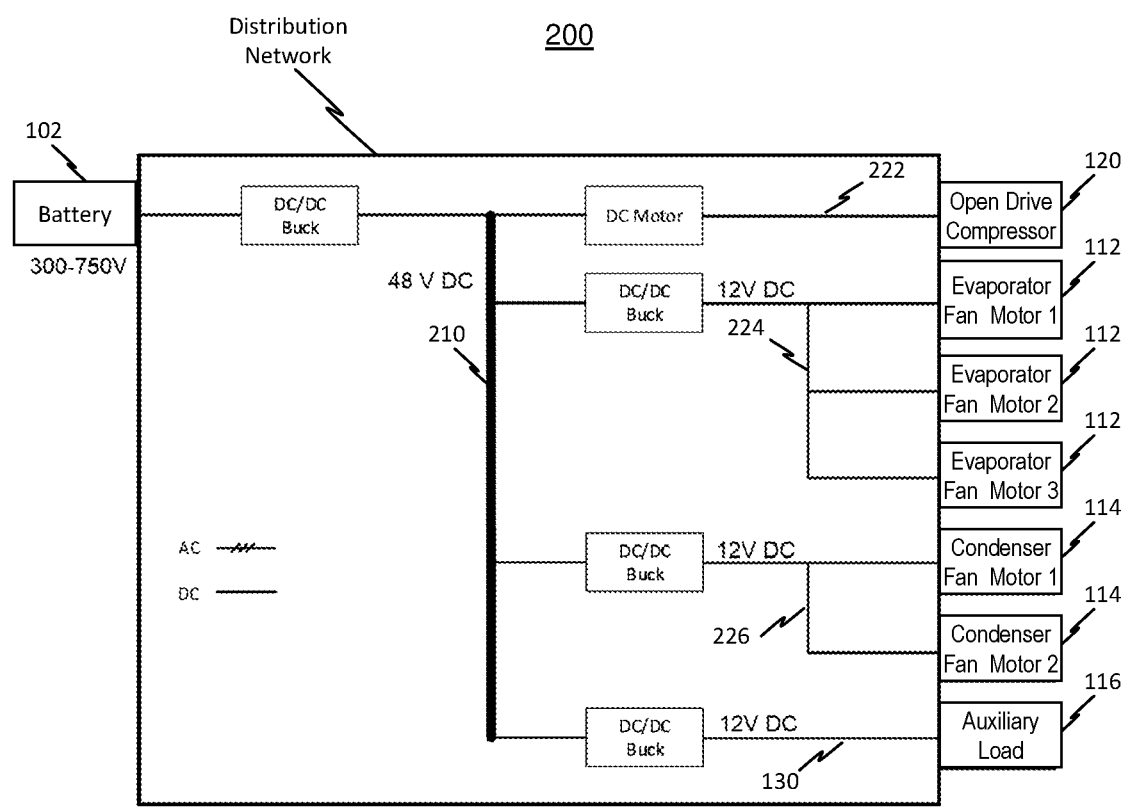
FIG. 2 depicts an exemplary electrical architecture for a TRU configured to receive high-voltage power, in accordance with one or more embodiments of the disclosure.

FIG. 2 depicts an electrical architecture for a system 200 using a high-voltage power source in accordance with one or more embodiments of the disclosure. As shown in FIG. 2, the system 200 includes the DC source 102 and similar loads (evaporator fan 112, condenser fan 114, auxiliary unit 116, compressor 120) as shown in FIG. 1. The distribution network of FIG. 2 can include a distribution bus 210. The distribution bus 210 may be a low-voltage DC distribution bus that is coupled to the DC source 102 through the DC/DC buck converter. The distribution bus 210 may be coupled to a compressor bus 222, an evaporator bus 224, and a condenser bus 226. As shown in FIG. 2, the evaporator bus 224 and the condenser bus 226 are coupled to respective DC/DC buck converters that are independent and different from one another. In different embodiments, the distribution bus may be further coupled to an auxiliary unit bus 130.

Figure 3:
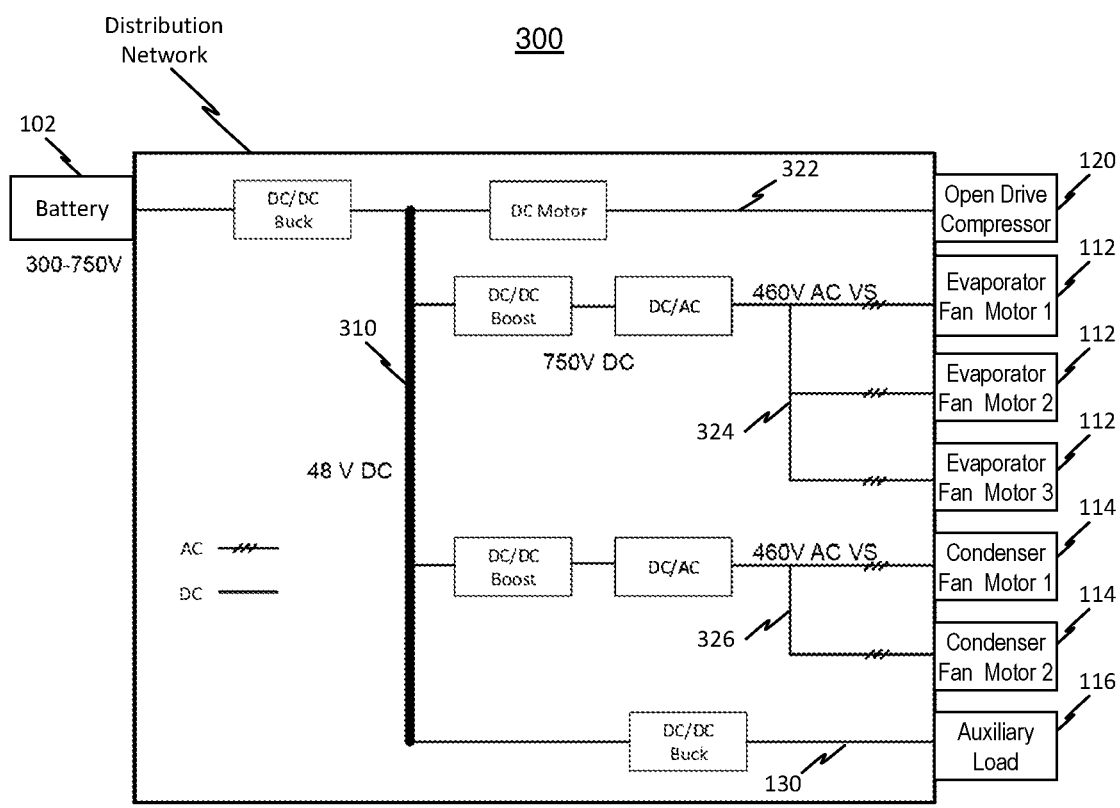
FIG. 3 depicts an exemplary electrical architecture for a TRU configured to receive high-voltage power, in accordance with one or more embodiments of the disclosure.

FIG. 3 depicts an electrical architecture for a system 300 using a high-voltage power source in accordance with one or more embodiments of the disclosure. As shown in FIG. 3, the system 300 includes the DC source 102 and similar loads (evaporator fan 112, condenser fan 114, auxiliary unit 116, compressor 120) as shown in FIG. 1. The distribution network of FIG. 3 can include a distribution bus 310. The distribution bus 310 may be a low-voltage DC distribution bus that is coupled to the DC source 102 through the DC/DC buck converter. The distribution bus 310 may be coupled to a compressor bus 322, an evaporator bus 324, and a condenser bus 326. In different embodiments, the distribution bus may be further coupled to an auxiliary unit bus 130.

The compressor bus 322 can include a motor, where the motor is operably coupled to the compressor 120. An evaporator bus 324 and a condenser bus 326 can each include a DC/DC boost converter that can be coupled to a DC/AC converter, where the evaporator bus 324 and the condenser bus 326 can be further coupled to the distribution bus 310 through respective DC/DC boost converters. DC/DC boost converters are configured to increase or step-up the 48 VDC to 750 VDC and DC/AC converters are configured to convert the 750 VDC to 460 VAC that is provided for the operation of the evaporator fan 112 and the condenser fan 114, respectively. The auxiliary unit bus 130 may include a DC/DC buck converter to step-down the voltage of the distribution bus 310 to an appropriate voltage for any connected auxiliary units 116.

Figure 4:
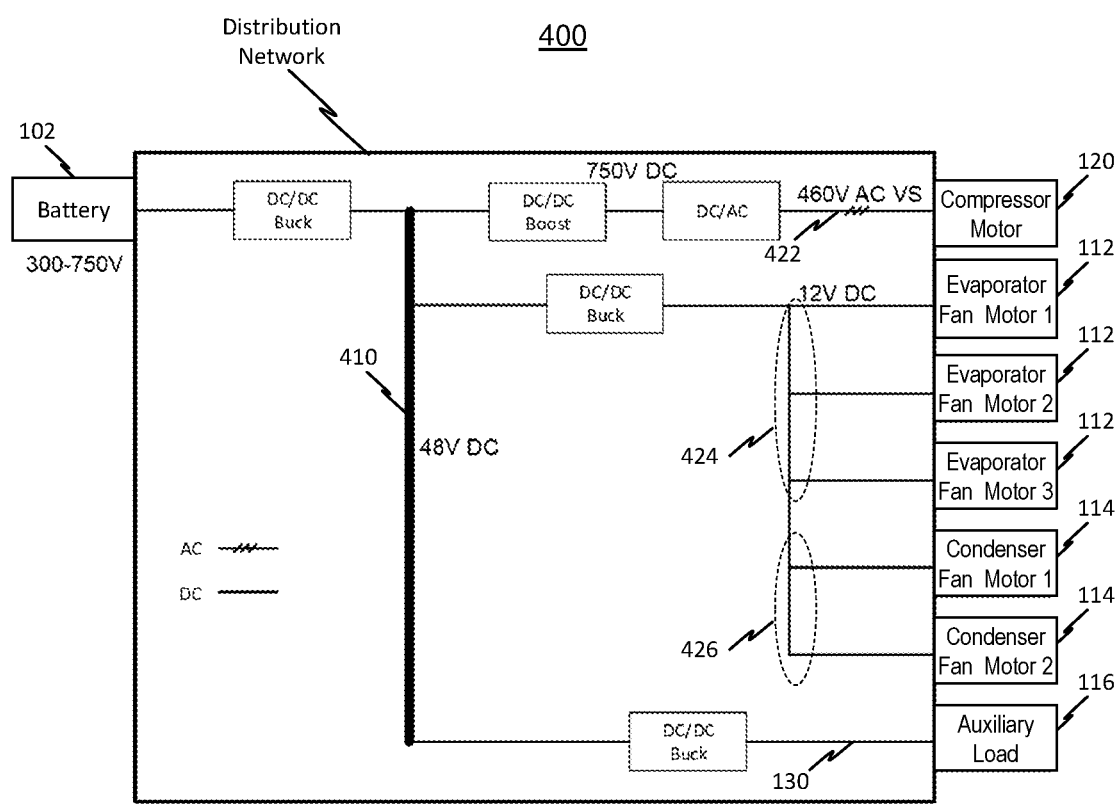
FIG. 4 depicts an exemplary electrical architecture for a TRU configured to receive high-voltage power, in accordance with one or more embodiments of the disclosure.

FIG. 4 depicts an electrical architecture for a system 400 using a high-voltage power source in accordance with one or more embodiments of the disclosure. As shown in FIG. 4, the system 400 includes the DC source 102 and similar loads (evaporator fan 112, condenser fan 114, auxiliary unit 116, compressor 120) as shown in FIG. 1. The distribution network of FIG. 4 can include a distribution bus 410. The distribution bus 410 may be a low-voltage DC distribution bus that is coupled to the DC source 102 through the DC/DC buck converter. The distribution bus 410 may be coupled to a compressor bus 422, an evaporator bus 424, and a condenser bus 426. As shown in FIG. 4, the evaporator bus 424 and the condenser bus 426 are coupled to a single DC/DC buck converter. In different embodiments, the distribution bus may be further coupled to an auxiliary unit bus 130.

Figure 5:
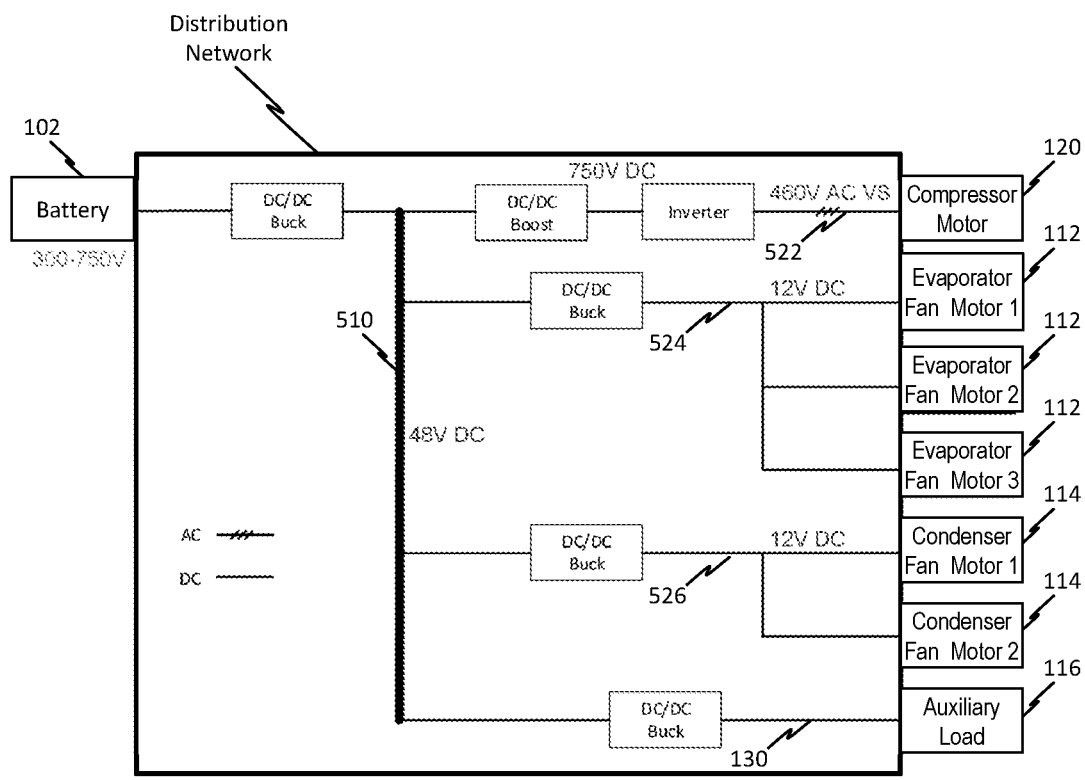
FIG. 5 depicts an exemplary electrical architecture for a TRU configured to receive high-voltage power, in accordance with one or more embodiments of the disclosure.

FIG. 5 depicts an electrical architecture of a system 500 for a high-voltage power source in accordance with one or more embodiments of the disclosure. As shown in FIG. 5, the system 500 includes the DC source 102 and similar loads (evaporator fan 112, condenser fan 114, auxiliary load 116, compressor 120) as shown in FIG. 1. The distribution bus 510 may be a low-voltage DC distribution bus that is coupled to the DC source 102 through the DC/DC buck converter. The distribution network of FIG. 5 may include a distribution bus 510 that is coupled to the compressor bus 522, the evaporator bus 524, and the condenser bus 526. In different embodiments, the distribution bus 510 may further be coupled to an auxiliary unit bus 130.

The compressor bus 522 can include a DC/DC boost converter that is coupled to a DC/AC converter (inverter). In this non-limiting example, the DC/DC boost converter is configured to increase or step-up the 48 VDC to 750 VDC, and the DC/AC converter is configured to convert the 750 VDC to 460 VAC that is provided for the operation of the compressor 120.

The evaporator bus 524 can include a DC/DC buck converter that is configured to step-down the voltage of the distribution bus 310 from 48 VDC to 12 VDC for the operation of the evaporator fan 112. Similarly, the condenser bus 526 can include a DC/DC buck converter that is configured step-down the voltage of the distribution bus 310 from 48 VDC to 12 VDC for the operation of the condenser fan 114.

Figure 6:
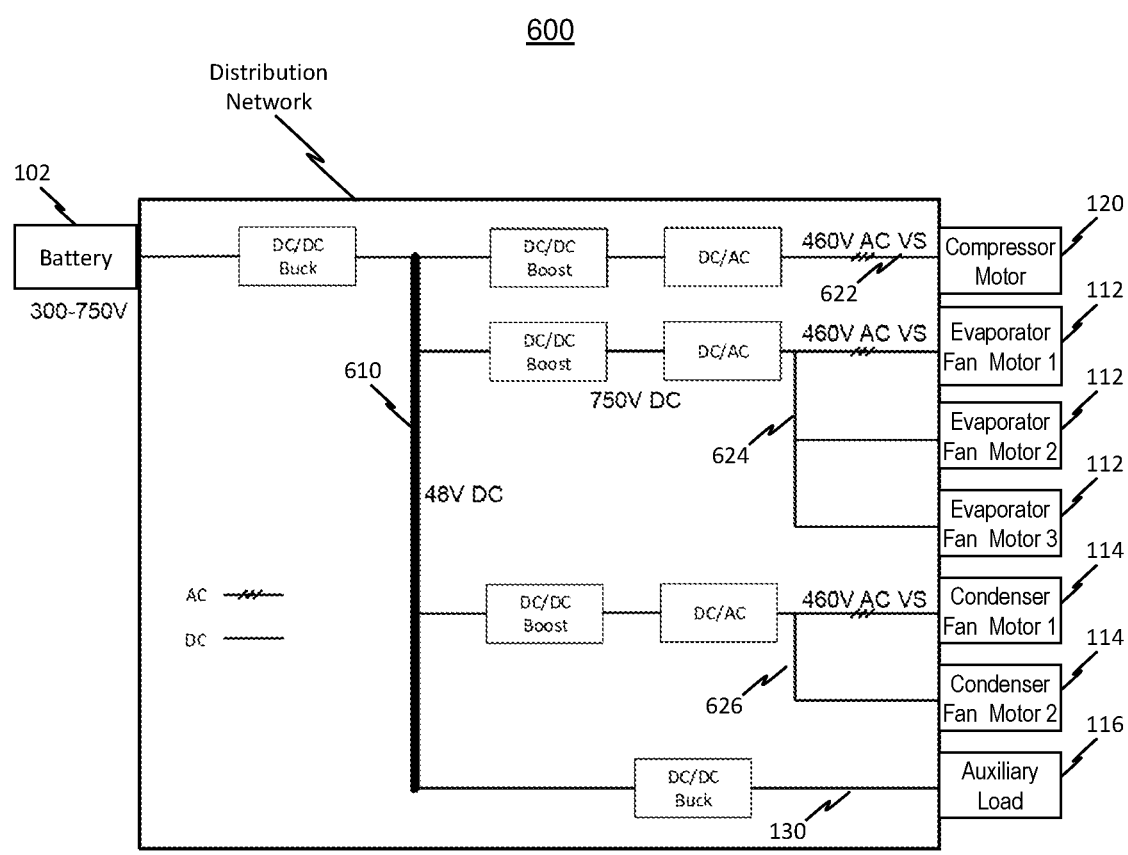
FIG. 6 depicts an exemplary electrical architecture for a TRU configured to receive high-voltage power, in accordance with one or more embodiments of the disclosure.

FIG. 6 depicts an electrical architecture for a system 600 using a high-voltage power source in accordance with one or more embodiments of the disclosure. As shown in FIG. 6, the system 600 includes the DC source 102 and similar loads (evaporator fan 112, condenser fan 114, auxiliary load 116, compressor 120) as shown in FIG. 1. The distribution bus 610 may be a low-voltage DC distribution bus that is coupled to the DC source 102 through the DC/DC buck converter. The distribution network of FIG. 6 may be a distribution bus 610 that is coupled to the compressor bus 622, the evaporator bus 624, and the condenser bus 626. In different embodiments, the distribution bus 610 may further be coupled to an auxiliary unit bus 130.

In one or more embodiments of the disclosure, the compressor bus 622 can include a DC/DC boost converter that is coupled to the DC/AC converter. In this non-limiting example, the DC-DC boost converter is configured to increase the 48 VDC to 750 VDC and the DC/AC converter is configured to convert the 750 VDC to 460 VAC that is provided for the operation of the compressor 120.

Similarly, the evaporator bus 624 and the condenser bus 626 each include a DC-DC boost converter that is coupled to a DC/AC converter. In this non-limiting example, each DC-DC boost converter is configured to increase or step-up the 48 VDC to 750 VDC and each DC/AC converter is configured to convert the 750 VDC to 460 VAC to operate the evaporator fan 112 and the condenser fan 114, respectively.

Figure 7:
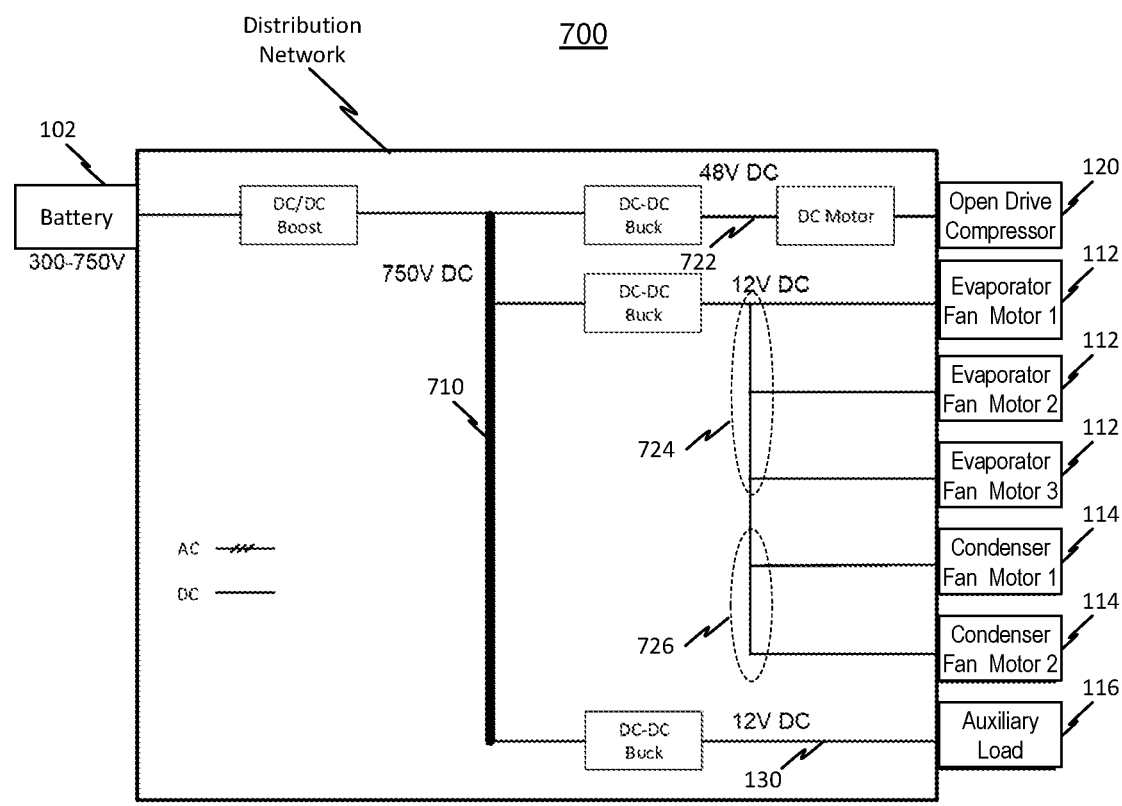
FIG. 7 depicts an exemplary electrical architecture for a TRU configured to receive high-voltage power, in accordance with one or more embodiments of the disclosure.

FIG. 7 depicts an electrical architecture for a system 700 using a high-voltage power source in accordance with one or more embodiments of the disclosure. As shown in FIG. 7, the system 700 includes the DC source 102 and similar loads (evaporator fan 112, condenser fan 114, auxiliary unit 116, compressor 120) as shown in FIG. 1. The distribution network of FIG. 7 can include a distribution bus 710. The distribution bus 710 may be a high-voltage DC distribution bus that is coupled to the DC source 102 through the DC/DC boost converter. The distribution bus 710 may be coupled to a compressor bus 722, an evaporator bus 724, and a condenser bus 726. As shown in FIG. 7, the evaporator bus 724 and the condenser bus 726 are coupled to a single DC-DC buck converter. In different embodiments, the distribution bus may be further coupled to an auxiliary unit bus 130.

Figure 8:
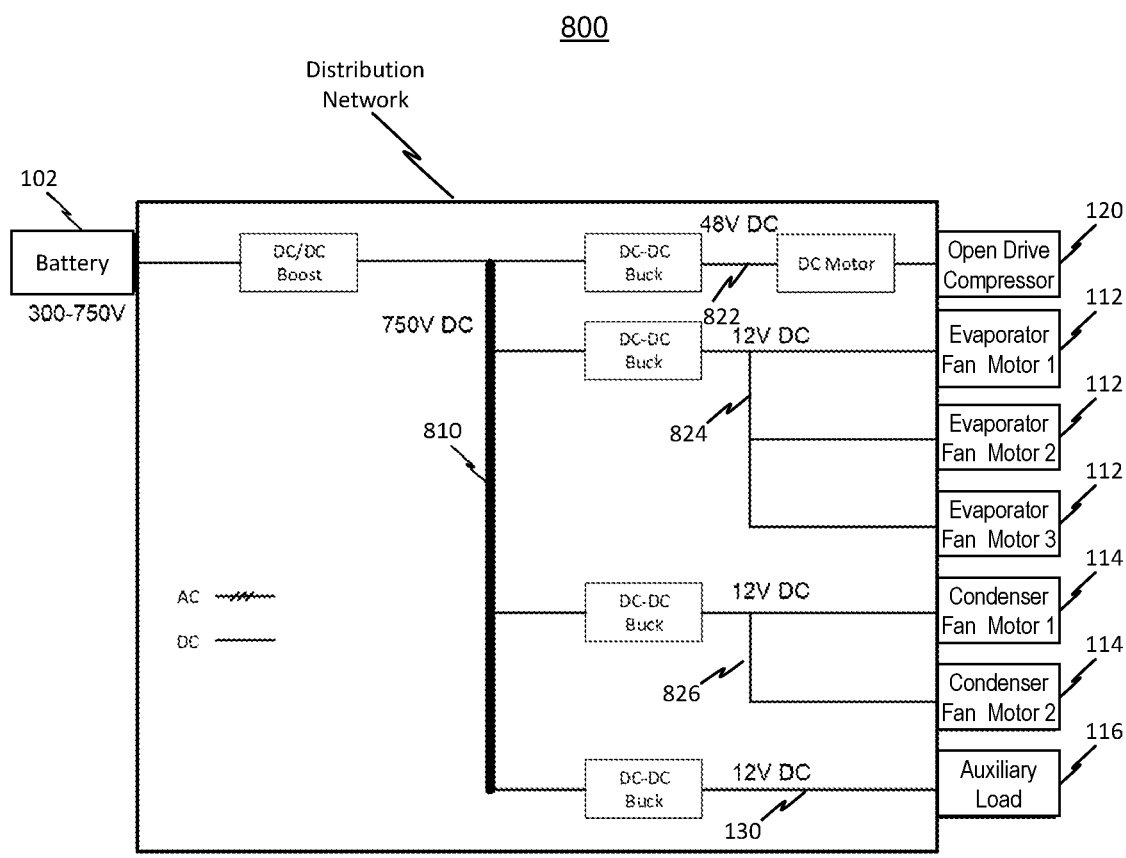
FIG. 8 depicts an exemplary electrical architecture for a TRU configured to receive high-voltage power, in accordance with one or more embodiments of the disclosure.

FIG. 8 depicts an electrical architecture for a system 800 using a high-voltage power source in accordance with one or more embodiments of the disclosure. The distribution network of FIG. 8 can include a DC/DC boost converter that is coupled to the DC source 102. The DC/DC boost converter can step-up the voltage of the DC source 102 for a distribution bus 810. The distribution bus 810 may be a high-voltage DC distribution bus, and may be coupled to the compressor bus 822, the evaporator bus 824, and the condenser bus 826. In different embodiments, the distribution bus 810 may further be coupled to an auxiliary unit bus 130.

The compressor bus can include a DC/DC buck converter coupled to a motor used to drive a compressor 120. The DC/DC buck converter can be configured to step-down the voltage of the high-voltage DC distribution bus. The evaporator bus 824 can include a DC/DC buck converter to step-down the voltage of the high-voltage DC distribution bus to a lower DC voltage for operation of the evaporator fan 112. Similarly, the condenser bus 826 may comprise DC/DC buck converter to step-down the voltage of the high-voltage DC distribution bus to a lower DC voltage for operation of the condenser fan 114.

Figure 9:
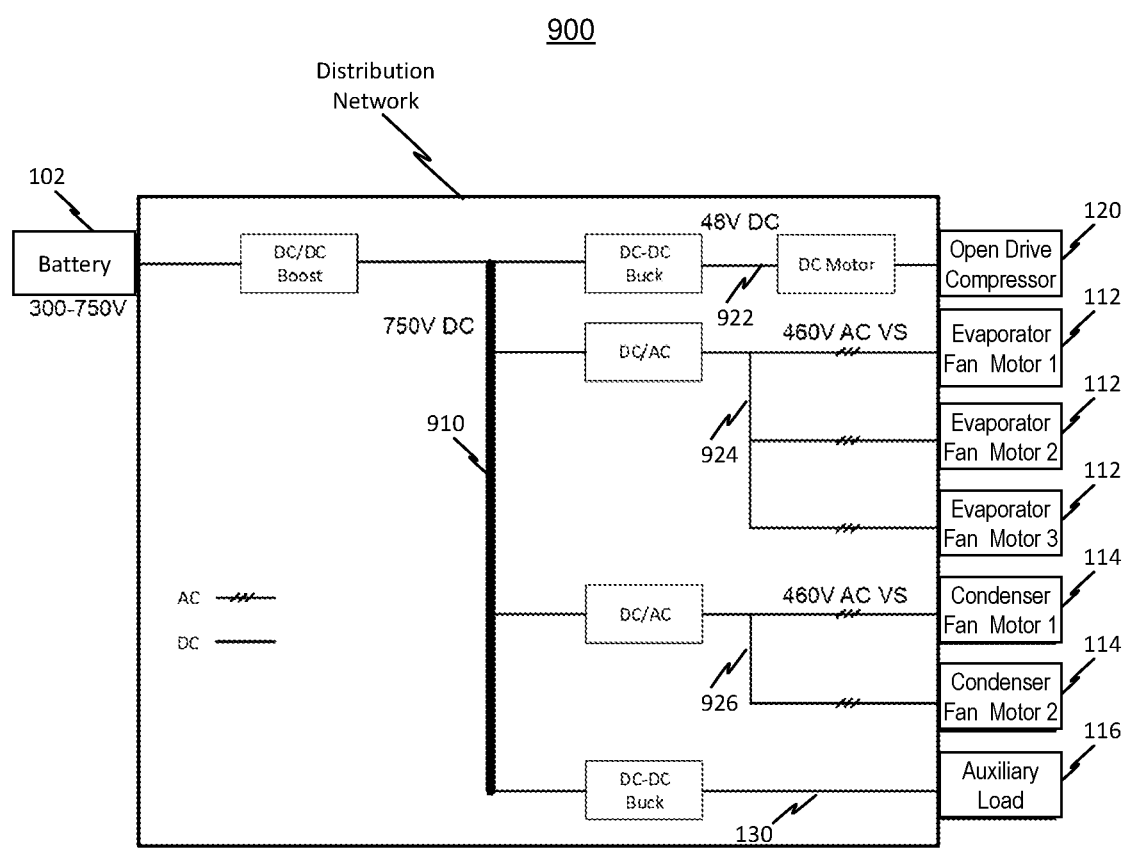
FIG. 9 depicts an exemplary electrical architecture for a TRU configured to receive high-voltage power, in accordance with one or more embodiments of the disclosure.

FIG. 9 depicts an electrical architecture for a system 900 using a high-voltage power source in accordance with one or more embodiments of the disclosure. The distribution network of FIG. 9 can include a DC/DC boost converter that is coupled to the DC source 102. The distribution bus 910 may be a high-voltage DC distribution bus, and may be coupled to the compressor bus 922, the evaporator bus 924, and the condenser bus 926. In different embodiments, the distribution bus 910 may further be coupled to an auxiliary unit bus 130.

The compressor bus 922 may comprise a DC/DC buck converter coupled to a motor used to drive a compressor 120. The DC/DC buck converter can be configured to step-down the voltage of the high-voltage DC distribution bus. The evaporator bus 924 can include a DC/AC converter to convert the voltage of the high-voltage DC distribution bus. For example, the DC/AC converter can be configured to convert the 750 VDC to 460 VAC to operate the evaporator fan 112. Similarly, the condenser bus 926 can include a DC/AC converter to convert the power of the high-voltage DC distribution bus. For example, the DC/AC converter can be configured to convert the 750 VDC to 460 VAC to operate the condenser fan 114.

Figure 10:
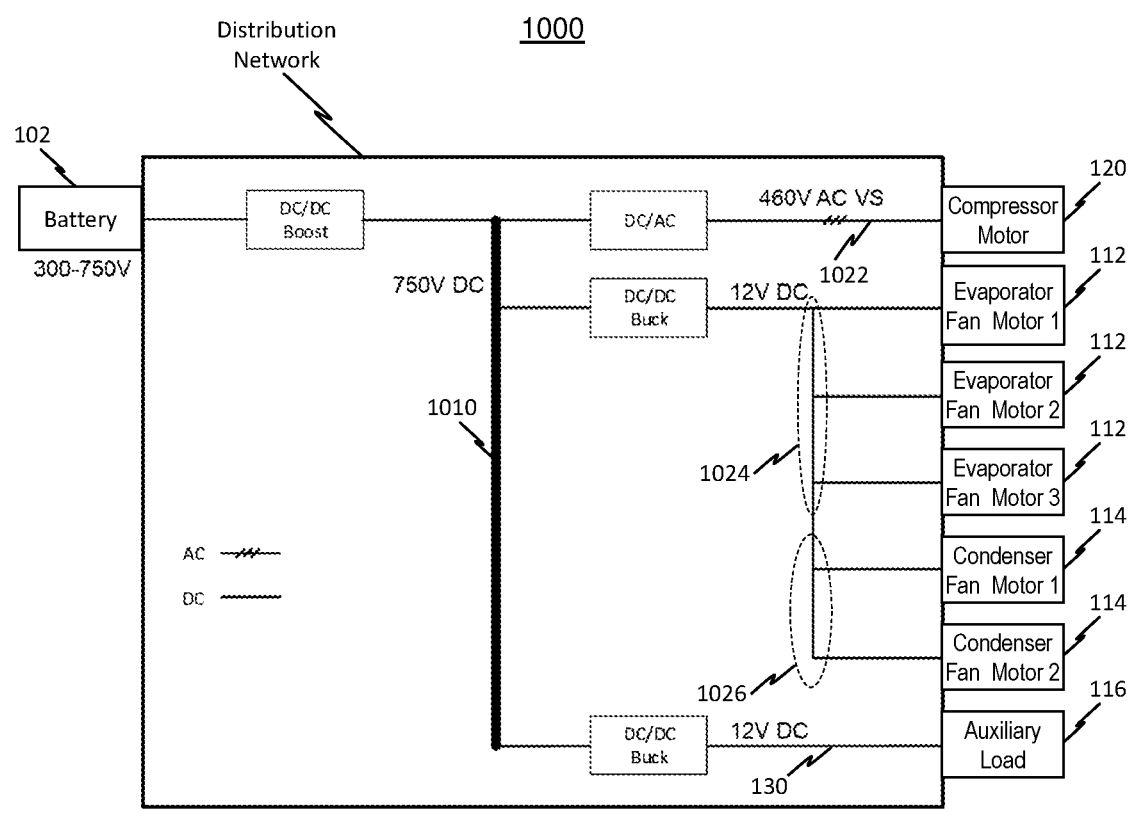
FIG. 10 depicts an exemplary electrical architecture for a TRU configured to receive high-voltage power, in accordance with one or more embodiments of the disclosure.

FIG. 10 depicts an electrical architecture for a system 1000 using a high-voltage power source in accordance with one or more embodiments of the disclosure. As shown in FIG. 10, the system 1000 includes the DC source 102 and similar loads (evaporator fan 112, condenser fan 114, auxiliary unit 116, compressor 120) as shown in FIG. 1. The distribution network of FIG. 10 can include a distribution bus 1010. The distribution bus 1010 may be a high-voltage DC distribution bus that is coupled to the DC source 102 through the DC/DC boost converter. The distribution bus 1010 may be coupled to a compressor bus 1022, an evaporator bus 1024, and a condenser bus 1026. As shown in FIG. 10, the evaporator bus 1024 and the condenser bus 1026 are coupled to a single DC/DC buck converter. In different embodiments, the distribution bus may be further coupled to an auxiliary unit bus 130.

Figure 11:
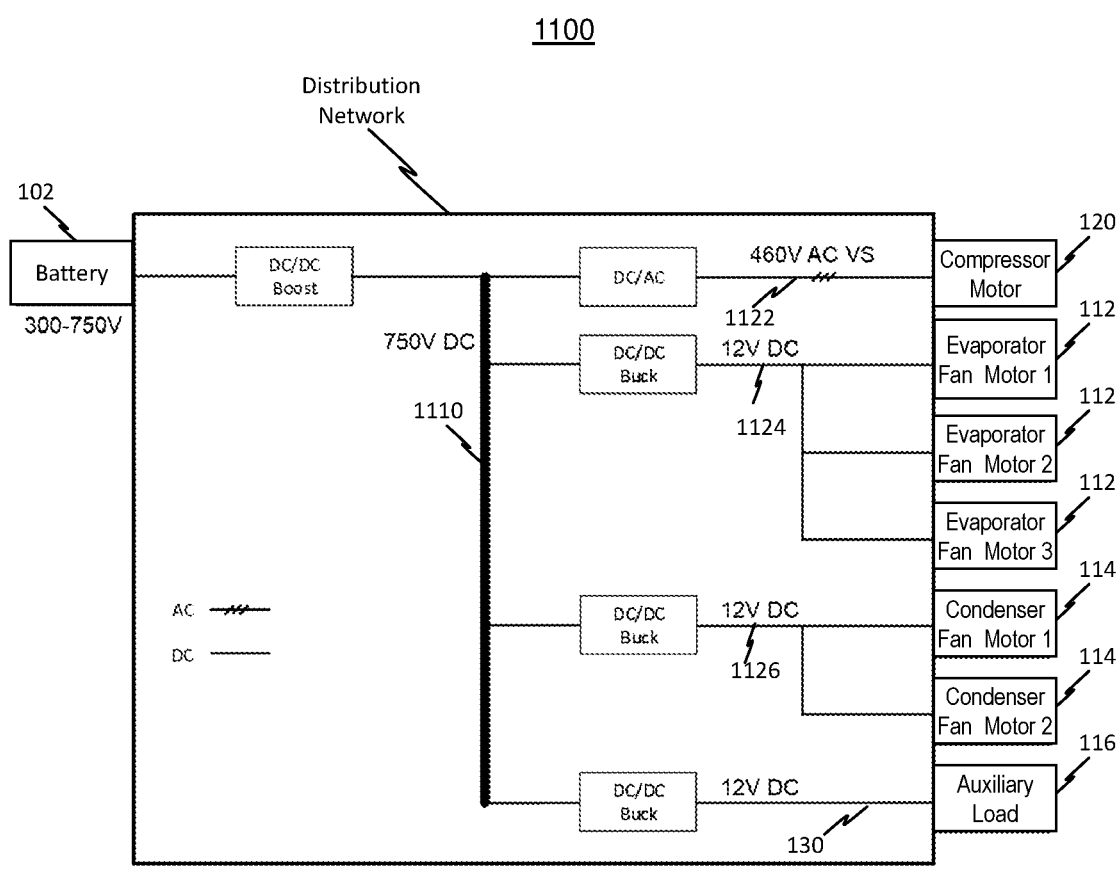
FIG. 11 depicts an exemplary electrical architecture for a TRU configured to receive high-voltage power, in accordance with one or more embodiments of the disclosure.

FIG. 11 depicts an electrical architecture for a system 1100 using a high-voltage power source in accordance with one or more embodiments of the disclosure. The distribution network of FIG. 11 can include a DC/DC boost converter that is coupled to the DC source 102. The distribution bus 1110 may be a high-voltage DC distribution bus and may be coupled to the compressor bus 1122, the evaporator bus 1124, and the condenser bus 1126. In different embodiments, the distribution bus 1110 may further be coupled to an auxiliary unit bus 130.

The compressor bus 1122 can include a DC/AC converter that is configured to convert the voltage of the distribution bus 1110 for the operation of the compressor 120. For example, the DC/AC converter can be configured to convert the 750 VDC to 460 VAC to operate the compressor 120. The evaporator bus 1124 and the condenser bus 1126 can be coupled to the distribution bus 1110 through respective DC/DC buck converters. The evaporator bus 1124 and the condenser bus 1126 provide lower DC voltage for operation of the evaporator fan 112 and the condenser fan 114, respectively. In other embodiments, the second distribution bus is further operable to provide power to an auxiliary unit 116.

Figure 12:
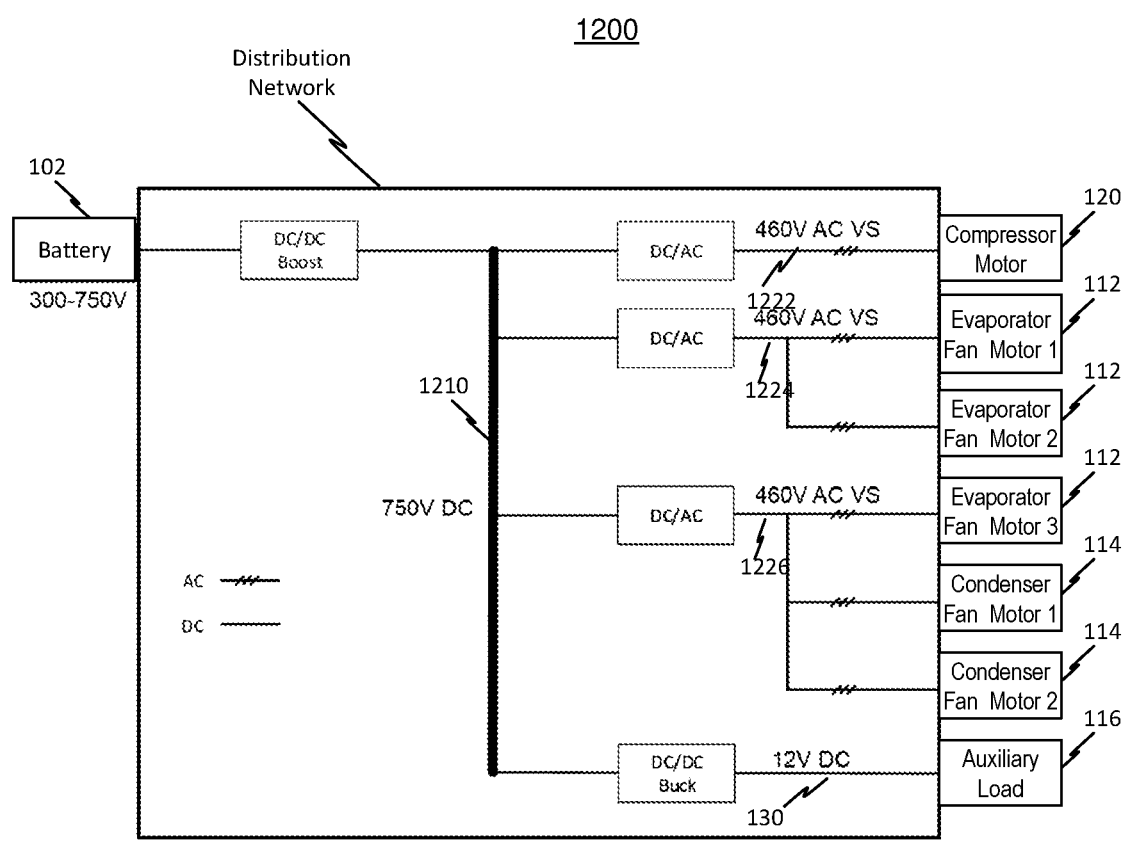
FIG. 12 depicts an exemplary electrical architecture for a TRU configured to receive high-voltage power, in accordance with one or more embodiments of the disclosure.

FIG. 12 depicts an electrical architecture for a system 1200 for a high-voltage power source in accordance with one or more embodiments of the disclosure. The distribution network of FIG. 12 can include a DC/DC boost converter that is coupled to the DC source 102. The distribution bus 1210 may be a high-voltage DC distribution bus, and may be coupled to the compressor bus 1222, the evaporator bus 1224, and the condenser bus 1226. In different embodiments, the distribution bus 1210 may further be coupled to an auxiliary unit bus 130.

The compressor bus 1222 can include a DC/AC converter for the operation of the compressor 120. The DC/AC converter is configured to convert the voltage of the distribution bus 1210. For example, the DC/AC converter can be configured to convert the 750 VDC to 460 VAC to operate the compressor 120.

The evaporator bus 1224 can include a DC/AC converter to convert the voltage of the high-voltage DC distribution bus. For example, the DC/AC converter can be configured to convert the 750 VDC to 460 VAC to operate the evaporator fan 112. Similarly, the condenser bus 1226 can include a DC/AC converter to convert the voltage of the high-voltage DC distribution bus. For example, the DC/AC converter can be configured to convert the 750 VDC to 460 VAC to operate the condenser fan 114.

Figure 13:
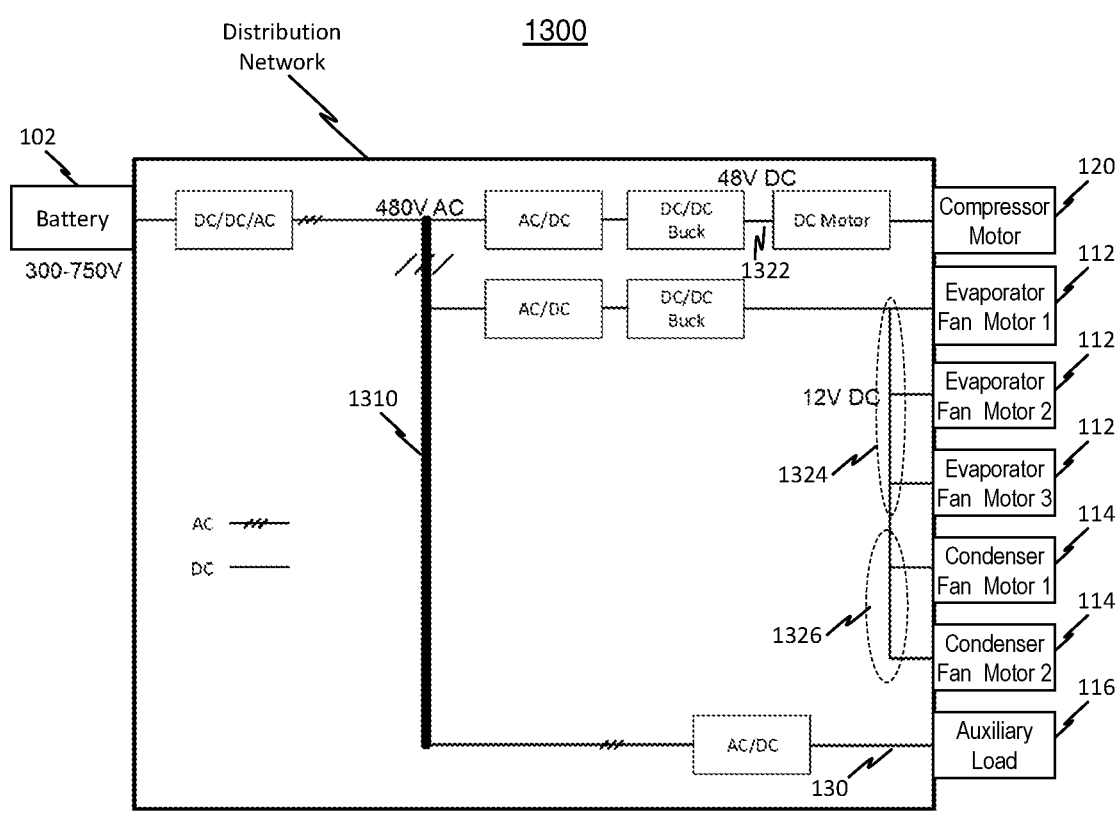
FIG. 13 depicts an exemplary electrical architecture for a TRU configured to receive high-voltage power, in accordance with one or more embodiments of the disclosure.

FIG. 13 depicts an electrical architecture for a system 1300 using a high-voltage power source in accordance with one or more embodiments of the disclosure. As shown in FIG. 13, the system 1300 includes the DC source 102 and similar loads (evaporator fan 112, condenser fan 114, auxiliary unit 116, compressor 120) as shown in FIG. 1. The distribution network of FIG. 13 can include a distribution bus 1310. The distribution bus 1310 may be a high-voltage AC distribution bus that is coupled to the DC source 102 through the DC/DC/AC converter. The distribution bus 1310 may be coupled to a compressor bus 1322, an evaporator bus 1324, and a condenser bus 1326.

The compressor bus 1322 may comprise an AC/DC converter that is coupled to a DC/DC buck converter that is further coupled to a motor. The AC/DC converter may be configured to convert the high-voltage AC from the distribution 1310 to DC voltage and the DC/DC buck converter may be operable to step-down the DC voltage, i.e., 48 VDC, to a voltage that is appropriate to operate the motor of the compressor.

The evaporator bus 1324 and the condenser bus 1326 are coupled to high voltage AC distribution bus through the same AC/DC converter and DC/DC buck converter.

Figure 14:
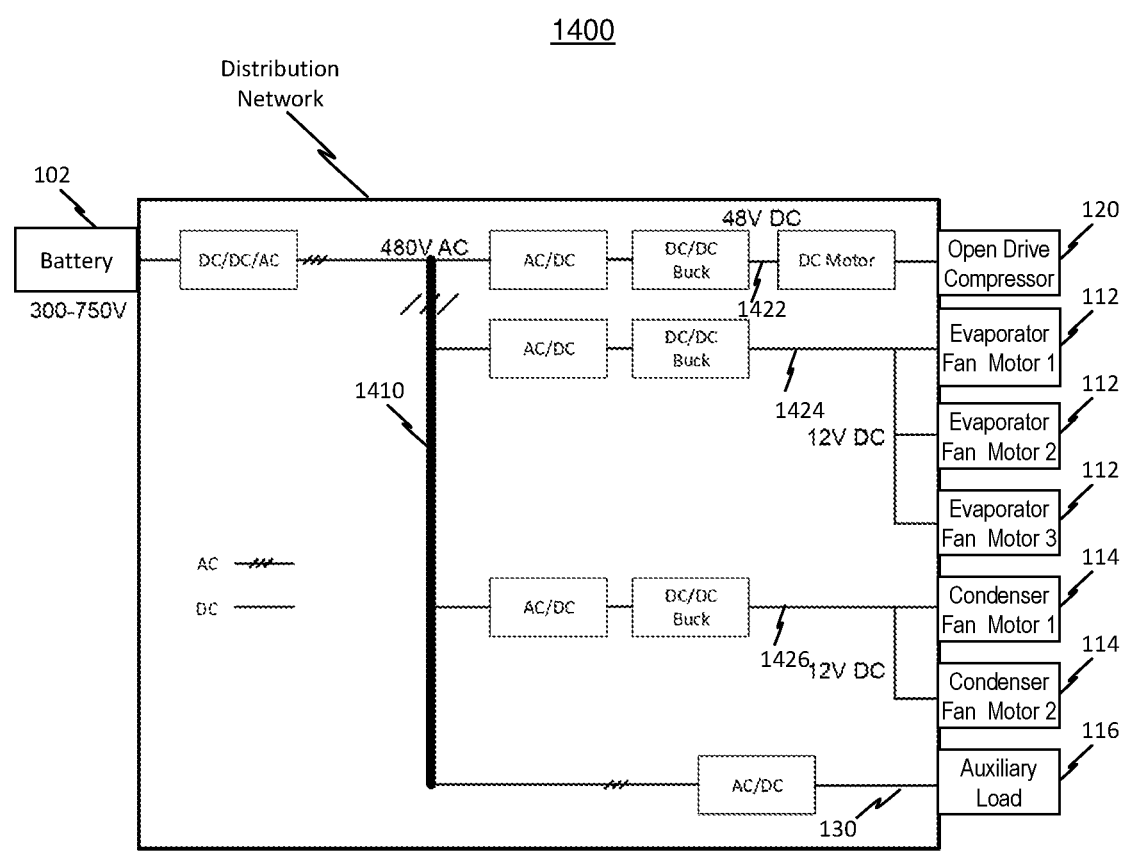
FIG. 14 depicts an exemplary electrical architecture for a TRU configured to receive high-voltage power, in accordance with one or more embodiments of the disclosure.

FIG. 14 depicts an electrical architecture for a system 1400 using a high-voltage power source in accordance with one or more embodiments of the disclosure. The distribution network of FIG. 14 can include a converter that is coupled to the DC power source 102 and a distribution bus 1410. The converter may comprise a DC/DC/AC converter that is operable to convert the voltage from the DC power source 102 to high-voltage AC for distribution to various loads over a distribution bus 1410. The various loads may include such loads as the evaporator fan 112, the condenser fan 114, the auxiliary unit 116, and the compressor 120 shown in FIG. 1.

The distribution bus 1410 may be a high-voltage AC distribution bus, i.e., 480 VAC. The distribution bus 1410 may be coupled to a compressor bus 1422, an evaporator bus 1424, and a condenser bus 1426. In a further embodiment, the distribution bus 1410 may be coupled to an auxiliary unit bus 130 including, for example, a battery charger that is operable to charge a connected battery.

The compressor bus 1422 may comprise an AC/DC converter that is coupled to a DC/DC buck converter that is further coupled to a motor. The AC/DC converter may be configured to convert the high-voltage AC from the distribution 1410 to DC voltage and the DC/DC buck converter may be operable to step-down the DC voltage, i.e., 48 VDC, to a voltage that is appropriate to operate the motor of the compressor.

The evaporator bus 1424 and the condenser bus 1426 may each comprise an AC/DC converter that is coupled to a DC/DC buck converter to condition the power to operate the evaporator fan 112 and the condenser fan 114, respectively.

Figure 15:
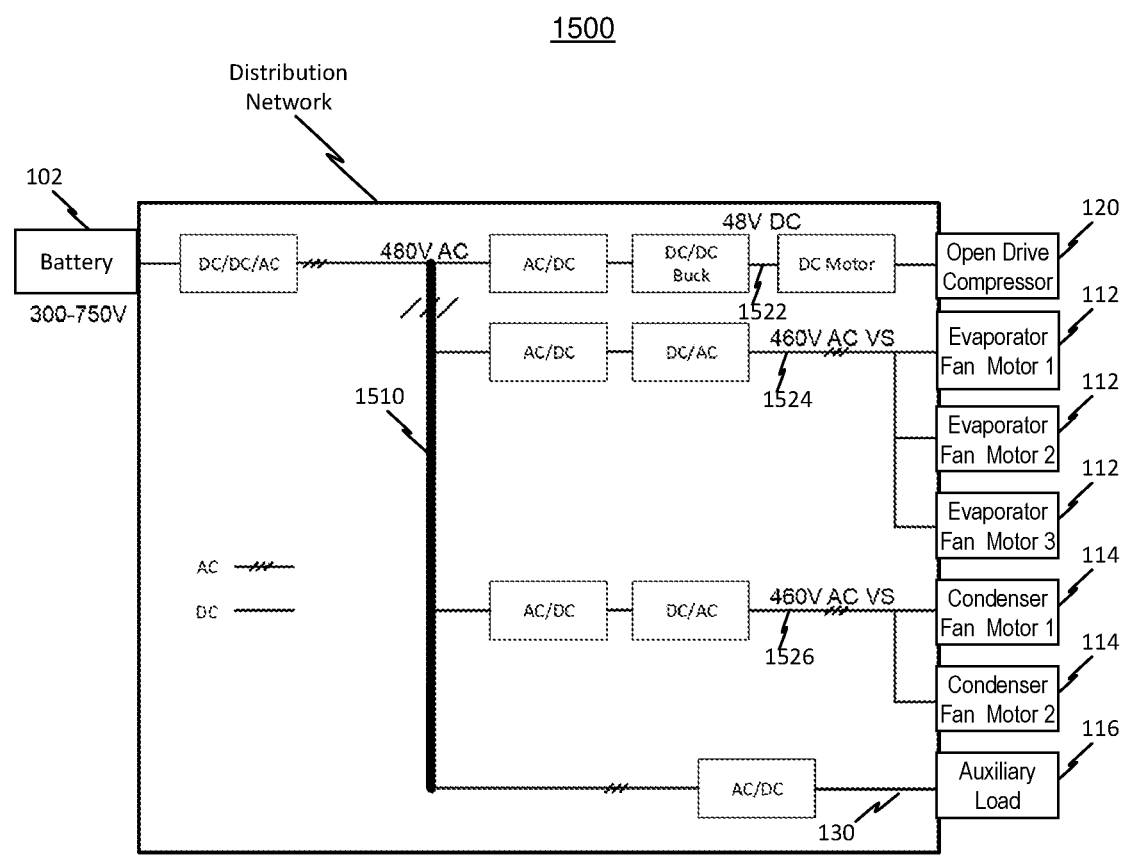
FIG. 15 depicts an exemplary electrical architecture for a TRU configured to receive high-voltage power, in accordance with one or more embodiments of the disclosure.

FIG. 15 depicts an electrical architecture for a system 1500 using a high-voltage power source in accordance with one or more embodiments of the disclosure. The distribution network of FIG. 15 can include a converter that is coupled to the DC power source 102 and distribution bus 1510. The converter may comprise a DC/DC/AC converter that is operable to convert the voltage from the DC power source 102 to high-voltage AC for distribution to various loads over a distribution bus 1510. The first stage of the DC/DC/AC converter can step-up the voltage of the DC source 102 to the appropriate level and then convert the DC to AC for the distribution bus 1510. The various loads may include such loads as the evaporator fan 112, the condenser fan 114, the auxiliary unit 116, and the compressor 120 shown in FIG. 1.

The distribution bus 1510 may be a high-voltage AC distribution bus, i.e., 480 VAC, and may be coupled to a compressor bus 1522, an evaporator bus 1524, and a condenser bus 1526. In a further embodiment, the distribution bus 1510 may be coupled to an auxiliary unit bus 130 including, for example, a battery charger that is operable to charge a connected battery.

The compressor bus 1522 may comprise an AC/DC converter that is coupled to a DC/DC buck converter that is further coupled to a motor. The AC/DC converter may be configured to convert the high-voltage AC from the distribution 1510 to DC voltage and the DC/DC buck converter may be operable to step-down the DC voltage, i.e., 48 VDC, to a voltage that is appropriate to operate the motor of the compressor. The evaporator bus 1524 and condenser bus 1526 can each include an AC/DC converter that is coupled to a DC/AC converter. The AC/DC converter may convert the 480 VAC from the distribution bus to 750 VDC and the DC/AC converter may convert the 750 VDC to 460 VAC to provide power to operate the connected refrigerated equipment.

Figure 16:
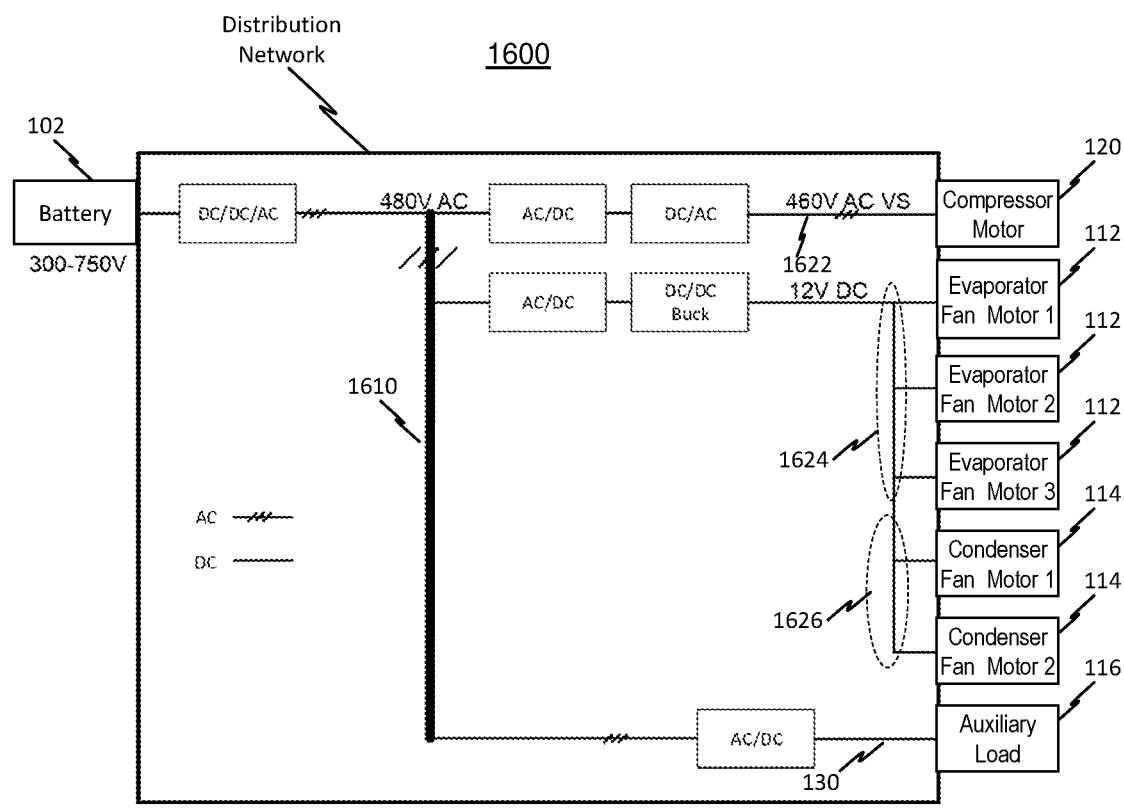
FIG. 16 depicts an exemplary electrical architecture for a TRU configured to receive high-voltage power, in accordance with one or more embodiments of the disclosure.

FIG. 16 depicts an electrical architecture for a system 1600 using a high-voltage power source in accordance with one or more embodiments of the disclosure. As shown in FIG. 16, the system 1600 includes the DC source 102 and similar loads (evaporator fan 112, condenser fan 114, auxiliary unit 116, compressor 120) as shown in FIG. 1. The distribution network of FIG. 16 can include a distribution bus 1610. The distribution bus 1610 may be a low-voltage DC distribution bus that is coupled to the DC source 102 through the DC/DC buck converter. The distribution bus 1610 may be coupled to a compressor bus 1622, an evaporator bus 1624, and a condenser bus 1626. As shown in FIG. 16, the evaporator bus and the condenser bus are coupled to the same DC/DC buck converter. In different embodiments, the distribution bus may be further coupled to an auxiliary unit bus 130.

Figure 17:
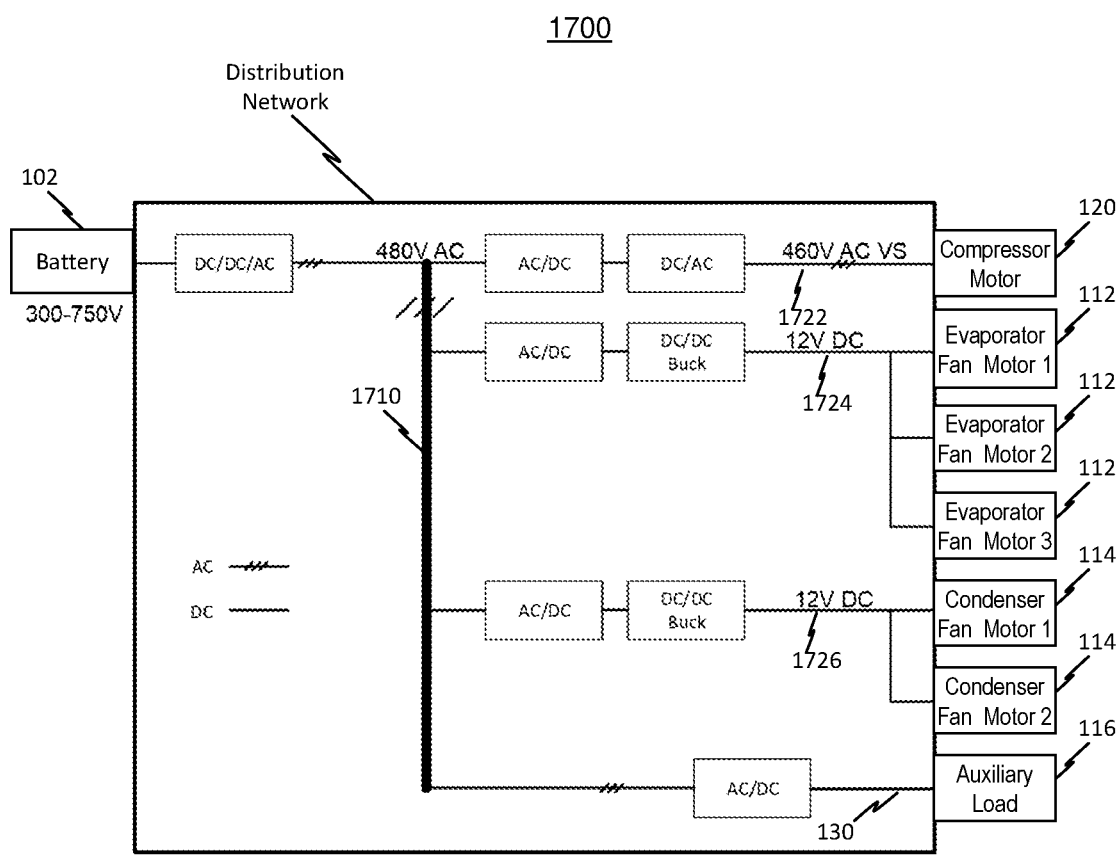
FIG. 17 depicts an exemplary electrical architecture for a TRU configured to receive high-voltage power, in accordance with one or more embodiments of the disclosure.

FIG. 17 depicts an electrical architecture for a system 1700 using high-voltage power source in accordance with one or more embodiments of the disclosure. The distribution network of FIG. 17 can include a converter that is coupled to the DC power source 102 and a distribution bus 1710. The converter may comprise a DC/DC/AC converter that is operable to convert the power from the DC power source 102 to high-voltage AC for distribution to various loads over a distribution bus 1710. The various loads may include such loads as the evaporator fan 112, the condenser fan 114, the auxiliary unit 116, and the compressor 120 shown in FIG. 1.

The distribution bus 1710 may be a high-voltage AC distribution bus. The distribution bus 1710 of FIG. 12 may be coupled to a compressor bus 1722, an evaporator bus 1724, and a condenser bus 1726. The compressor bus 1722 can include an AC/DC converter that is coupled to a DC/AC converter. The AC/DC converter may convert the 480 VAC from the distribution bus to 750 VDC and the DC/AC converter may convert the 750 VDC to 460 VAC to provide power to operate the compressor 120.

The evaporator bus 1724 and the condenser bus 1726 may each comprise an AC/DC converter that is coupled to a DC/DC buck converter to condition the power to operate the evaporator fan 112 and the condenser fan 114, respectively.

Figure 18:
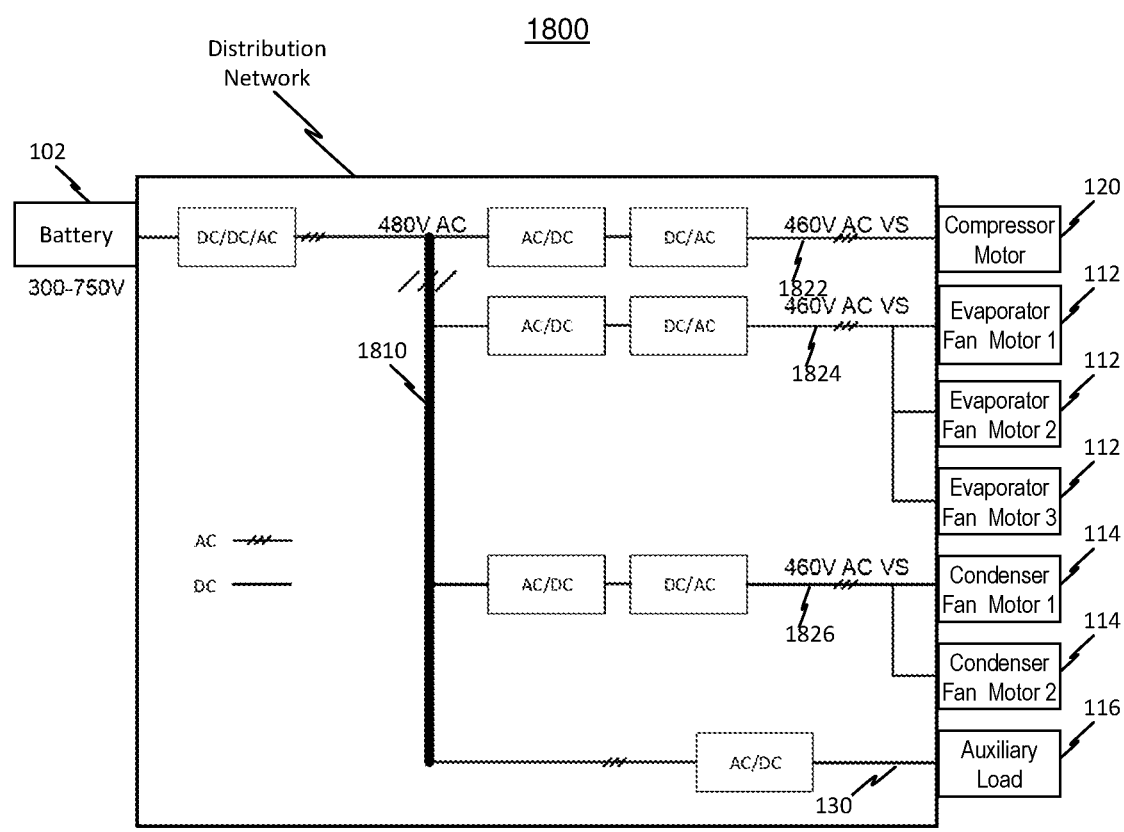
FIG. 18 depicts an exemplary electrical architecture for a TRU configured to receive high-voltage power, in accordance with one or more embodiments of the disclosure.

FIG. 18 depicts an electrical architecture for a system 1800 having a high-voltage power source in accordance with one or more embodiments of the disclosure. The distribution network of FIG. 18 can include a converter that is coupled to the DC power source 102 and a distribution bus 1810. The converter may comprise a DC/DC/AC converter that is operable to convert the power from the DC power source 102 to high-voltage AC for distribution to various loads over a distribution bus 1810. The various loads may include such loads as the evaporator fan 112, the condenser fan 114, the auxiliary unit 116, and the compressor 120 shown in FIG. 1.

The distribution bus 1810 may be a high-voltage AC distribution bus, and may be coupled to a compressor bus 1822, an evaporator bus 1824, and a condenser bus 1826. The compressor bus can include an AC/DC converter that is coupled to a DC/AC converter. The AC/DC converter may convert the 480 VAC from the distribution bus to 750 VDC and the DC/AC converter may convert the 750 VDC to 460 VAC to provide power to operate the compressor 120. Similarly, the evaporator bus 1824 and the condenser bus 1826 each comprise an AC/DC converter to convert the AC voltage from the distribution bus to a DC voltage and a DC/AC converter to convert the DC voltage from the AC/DC converter to operate the connected refrigeration equipment.

Figure 19:
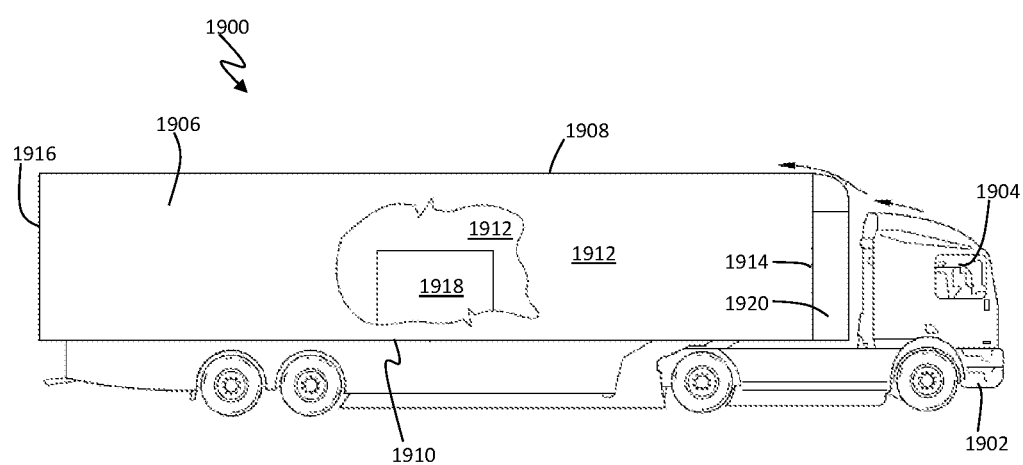
FIG. 19 depicts a tractor trailer system having a transport refrigeration unit and a cargo compartment in an exemplary embodiment for implementing an exemplary electrical architecture.

Shown in FIG. 19 is an embodiment of a tractor trailer system 100 for implementing one or more of the electrical architectures discussed with reference to FIGS. 1-18. The tractor trailer system 1900 includes a tractor 1902 including an operator's compartment or cab 1904 and also including an engine, which acts as the drive system of the tractor trailer system 1900. A trailer 1906 is coupled to the tractor 1902. The trailer 1906 is a refrigerated trailer 1906 and includes a top wall 1908, a directly opposed bottom wall 1910, opposed side walls 1912, and a front wall 1914, with the front wall 1914 being closest to the tractor 1902. The trailer 1906 further includes a door or doors (not shown) at a rear wall 1916, opposite the front wall 1914. The walls of the trailer 1906 define a cargo compartment. The trailer 1906 is configured to maintain a cargo 1918 located inside the cargo compartment at a selected temperature through the use of a transport refrigeration unit 120 located on the trailer 1906. The transport refrigeration unit 1920, as shown in FIG. 19, is located at or attached to the front wall 1914.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A high-voltage system of a transport refrigeration unit (TRU), the system comprising:
   a high-voltage direct current (HVDC) source;
   a first converter coupling the HVDC source to a distribution bus,
   wherein the distribution bus is coupled to a compressor, at least one condenser fan, and at least one evaporator fan;

wherein the distribution bus is coupled to a compressor bus coupled to the compressor, a condenser bus coupled to the at least one condenser fan, and an evaporator bus coupled to the at least one evaporator fan;

wherein the first converter is a DC-AC converter, wherein the distribution bus is an alternating current (AC) distribution bus;

wherein the compressor bus comprises a motor and an AC-DC converter coupled to a DC-DC buck converter, wherein the evaporator bus and the condenser bus are coupled to an AC-DC converter coupled to at least one DC-DC buck converter that is used to convert voltage from the distribution bus for the at least one evaporator fan and the at least one condenser fan.

2. The high-voltage system of claim 1, wherein the high-voltage DC source is between 100-750 volts.

3. A high-voltage system of a transport refrigeration unit (TRU), the system comprising:
a high-voltage direct current (HVDC) source;
a first converter coupling the HVDC source to a distribution bus,
wherein the distribution bus is coupled to a compressor, at least one condenser fan, and at least one evaporator fan;
wherein the distribution bus is coupled to a compressor bus coupled to the compressor, a condenser bus coupled to the at least one condenser fan, and an evaporator bus coupled to the at least one evaporator fan;
wherein the first converter is a DC-AC converter, wherein the distribution bus is an alternating current (AC) distribution bus;
wherein the compressor bus comprises a motor and an AC-DC converter coupled to a DC-DC buck converter,
wherein the evaporator bus comprises at least one first AC-DC converter coupled to a first DC-DC buck converter to convert voltage from the distribution bus for the at least one evaporator fan,
wherein the condenser bus comprises at least one second AC-DC converter coupled to a second DC-DC buck converter to convert voltage from the distribution bus for the at least one condenser fan, wherein the at least one first AC-DC converter and the at least one second AC-DC converter are different AC-DC converters wherein the at least one first DC-DC buck converter and the at least one second DC-DC buck converter are different DC-DC buck converters.

4. A high-voltage system of a transport refrigeration unit (TRU), the system comprising:
a high-voltage direct current (HVDC) source;
a first converter coupling the HVDC source to a distribution bus,
wherein the distribution bus is coupled to a compressor, at least one condenser fan, and at least one evaporator fan;
wherein the distribution bus is coupled to a compressor bus coupled to the compressor, a condenser bus coupled to the at least one condenser fan, and an evaporator bus coupled to the at least one evaporator fan;
wherein the first converter is a DC-AC converter, wherein the distribution bus is an alternating current (AC) distribution bus;
wherein the compressor bus comprises an AC-DC converter coupled to a DC-AC converter,
wherein the evaporator bus comprises an AC-DC converter coupled to a DC-AC converter,
wherein the condenser bus comprises an AC-DC converter coupled to a DC-AC converter.

5. A high-voltage system of a transport refrigeration unit (TRU), the system comprising:
a high-voltage direct current (HVDC) source;
a first converter coupling the HVDC source to a distribution bus,
wherein the distribution bus is coupled to a compressor, at least one condenser fan, and at least one evaporator fan;
wherein the distribution bus is coupled to a compressor bus coupled to the compressor, a condenser bus coupled to the at least one condenser fan, and an evaporator bus coupled to the at least one evaporator fan;
wherein the first converter is a DC-AC converter, wherein the distribution bus is an alternating current (AC) distribution bus;
wherein the compressor bus comprises an AC-DC converter coupled to a DC-AC converter,
wherein the evaporator bus and the condenser bus are coupled to an AC-DC converter coupled to at least one DC-DC buck converter that is used to convert voltage from the distribution bus for the at least one evaporator fan and the at least one condenser fan.

6. A high-voltage system of a transport refrigeration unit (TRU), the system comprising:
a high-voltage direct current (HVDC) source;
a first converter coupling the HVDC source to a distribution bus,
wherein the distribution bus is coupled to a compressor, at least one condenser fan, and at least one evaporator fan;
wherein the distribution bus is coupled to a compressor bus coupled to the compressor, a condenser bus coupled to the at least one condenser fan, and an evaporator bus coupled to the at least one evaporator fan;
wherein the first converter is a DC-AC converter, wherein the distribution bus is an alternating current (AC) distribution bus;
wherein the compressor bus comprises an AC-DC converter coupled to a DC-AC converter,
wherein the evaporator bus comprises at least one first AC-DC converter coupled to a first DC-DC buck converter to convert voltage from the distribution bus for the at least one evaporator fan,
wherein the condenser bus comprises at least one second AC-DC converter coupled to a second DC-DC buck converter to convert voltage from the distribution bus for the at least one condenser fan, wherein the at least one first AC-DC converter and the at least one second AC-DC converter are different AC-DC converters wherein the at least one first DC-DC buck converter and the at least one second DC-DC buck converter are different DC-DC buck converters.

7. A high-voltage system of a transport refrigeration unit (TRU), the system comprising:
a high-voltage direct current (HVDC) source;
a first converter coupling the HVDC source to a distribution bus,
wherein the distribution bus is coupled to a compressor, at least one condenser fan, and at least one evaporator fan;
wherein the distribution bus is coupled to a compressor bus coupled to the compressor, a condenser bus coupled to the at least one condenser fan, and an evaporator bus coupled to the at least one evaporator fan;

wherein the first converter is a DC-AC converter, wherein the distribution bus is an alternating current (AC) distribution bus;

wherein the compressor bus comprises an AC-DC converter coupled to a DC-AC converter, wherein the evaporator bus comprises an AC-DC converter coupled to a DC-AC converter, wherein the condenser bus comprises an AC-DC converter coupled to a DC-AC converter.

* * * * *